US012738669B2

(12) United States Patent
Nguyen

(10) Patent No.: US 12,738,669 B2
(45) Date of Patent: Sep. 15, 2026

(54) DIPOLE STRUCTURES AND ANTENNAE

(71) Applicant: BAE SYSTEMS PLC, London (GB)

(72) Inventor: Mark Christopher Nguyen, Great Baddow (GB)

(73) Assignee: BAE SYSTEMS PLC, London (GB)

( * ) Notice: Subject to any disclaimer, the term of this patent is extended or adjusted under 35 U.S.C. 154(b) by 70 days.

(21) Appl. No.: 18/864,342

(22) PCT Filed: May 5, 2023

(86) PCT No.: PCT/GB2023/051195
§ 371 (c)(1),
(2) Date: Nov. 8, 2024

(87) PCT Pub. No.: WO2023/218169
PCT Pub. Date: Nov. 16, 2023

(65) Prior Publication Data

US 2025/0300369 A1 Sep. 25, 2025

(30) Foreign Application Priority Data

May 10, 2022 (GB) ...................................... 2208111

(51) Int. Cl.
*H01Q 21/24* (2006.01)
*H01Q 9/16* (2006.01)
*H01Q 21/26* (2006.01)

(52) U.S. Cl.
CPC ............ *H01Q 21/245* (2013.01); *H01Q 9/16* (2013.01)

(58) Field of Classification Search
CPC ...... H01Q 21/26; H01Q 1/246; H01Q 21/062; H01Q 21/24; H01Q 5/48; H01Q 5/42;
(Continued)

(56) References Cited

U.S. PATENT DOCUMENTS

| | | | | |
|---|---|---|---|---|
| 9,099,777 | B1 * | 8/2015 | Manry, Jr. | H01Q 1/38 |
| 2008/0246680 | A1 * | 10/2008 | Rawnick | H01Q 21/00 343/810 |
| 2016/0301136 | A1 | 10/2016 | Jan et al. | |

FOREIGN PATENT DOCUMENTS

| | | |
|---|---|---|
| CN | 101877435 A | 11/2010 |
| CN | 108232458 A | 6/2018 |

(Continued)

OTHER PUBLICATIONS

GB Search Report under Section 17(5) received for GB Application No. 2208111.1, dated Oct. 31, 2022. 4 pages.

(Continued)

*Primary Examiner* — Wei (Victor) Y Chan
(74) *Attorney, Agent, or Firm* — Arcane Law PLLC

(57) ABSTRACT

In some examples, a dual polarized dipole structure comprises a first dipole arm comprising a first dipole and a second dipole arm comprising a second dipole, the first and second dipoles being substantially planar and being joined to each other at a feed point of the dipole structure disposed at the centre of the first and second arms, whereby to form a dual polarized dipole radiating element for an antenna structure, wherein the first dipole arm and the second dipole arm are so arranged, with respect to a square unit cell, such that the first dipole and the second dipole are orthogonal to one another and so arranged as to lie on respective diagonals of the square unit cell.

18 Claims, 2 Drawing Sheets

(58) Field of Classification Search
CPC ........ H01Q 9/285; H01Q 9/28; H01Q 19/108; H01Q 9/16; H01Q 1/521; H01Q 1/38
See application file for complete search history.

(56) References Cited

FOREIGN PATENT DOCUMENTS

| | | | |
|---|---|---|---|
| CN | 110401018 | A | 11/2019 |
| CN | 110707420 | A | 1/2020 |
| WO | WO2003103086 | A2 | 12/2003 |
| WO | WO2019173865 | A1 | 9/2019 |
| WO | WO2023218169 | A1 | 11/2023 |

OTHER PUBLICATIONS

International Search Report and Written Opinion received for PCT Application No. PCT/GB2023/051195. Mail date: Jul. 18, 2023. 11 pages.

* cited by examiner

DIPOLE STRUCTURES AND ANTENNAE

FIELD

The present invention relates generally to a dual polarised dipole structure. Aspects relate to antenna structures.

BACKGROUND

Low profile wideband antennas and antenna arrays can be used in high resolution radar systems. Dual polarised highly (or tightly) coupled dipole (HCD or TCD) antennas are examples of such wideband antennas. HCD radiating elements can be arranged according to a planar configuration, in which dipole arms are oriented in the XY plane, or according to a plank configuration in which dipole arms are oriented in the XZ/YZ planes, where the Z direction is the antenna boresight direction.

In an array of HCD radiating elements the highest frequency of operation is defined by certain aspects of the geometry. Specifically, the grid pitch between elements, which is set by the grating lobe requirements of the array, and the height of the dipole arms above the ground plane of the antenna array. The larger the grid pitch, the lower the frequency at which the grating lobes enter real space, which typically means that a smaller grid pitch is desirable. The height of the dipole arms above the ground plane is nominally half the wavelength of the highest desired frequency of operation. Once these two properties are set by the highest frequency of operation, an aim of an antenna designer will be to increase the bandwidth as much as possible to as low a frequency as possible.

SUMMARY

According to a first aspect of the present disclosure, there is provided a dual polarized dipole structure, comprising a first dipole arm comprising a first dipole and a second dipole arm comprising a second dipole, the first and second dipoles being substantially planar and being joined to each other at a feed point of the dipole structure disposed at the centre of the first and second arms, whereby to form a dual polarized dipole radiating element for an antenna structure, wherein the first dipole arm and the second dipole arm are so arranged, with respect to a square unit cell, such that the first dipole and the second dipole are orthogonal to one another and so arranged as to lie on respective diagonals of the square unit cell.

In an implementation of the first aspect, the terminal portions of the first and second dipole arms, distal the feed point, can be truncated, whereby to form triangular or cut-out end portions for the first and second dipoles. The square unit cell can have side p, and the first and second dipoles can extend diagonally across the square unit cell such that each of the first and second dipole arms have a length of $\sqrt{2}p$. A ground plane can be provided, and each radiating element can project outwardly from the ground plane. Respective end portions of each of the first and second dipole arms can comprise inter-capacitive regions.

According to a second aspect of the present disclosure, there is provided an antenna array comprising multiple unit cells, each unit cell defining a square and comprising a dual polarized dipole structure as provided according to the first aspect, wherein each dual polarized dipole structure defines a radiating element of the antenna array. Unit cells can be arranged in a regular tessellation. Each unit cell can comprise a feed line configured to supply a signal to a corresponding feed point of the unit cell. A set of mutual coupling plates configured to couple dipoles in unit cells adjacent one another can be provided. Each mutual coupling plate can be arranged underneath the plane of the dipoles. End portions of dipoles in unit cells adjacent one another can be so configured as to define inter-capacitive digits. Each of the first and second dipole arms can be coupled to three dipole arms of their respective nearest neighbours.

According to a third aspect of the present disclosure, there is provided a platform comprising an antenna array as provided according to the second aspect. At least a portion of an outer conductive surface of the platform can form a ground plane for the antenna array.

BRIEF DESCRIPTION OF THE FIGURES

Embodiments of the invention will now be described by way of example only with reference to the figures, in which.

DETAILED DESCRIPTION

Figure 1:
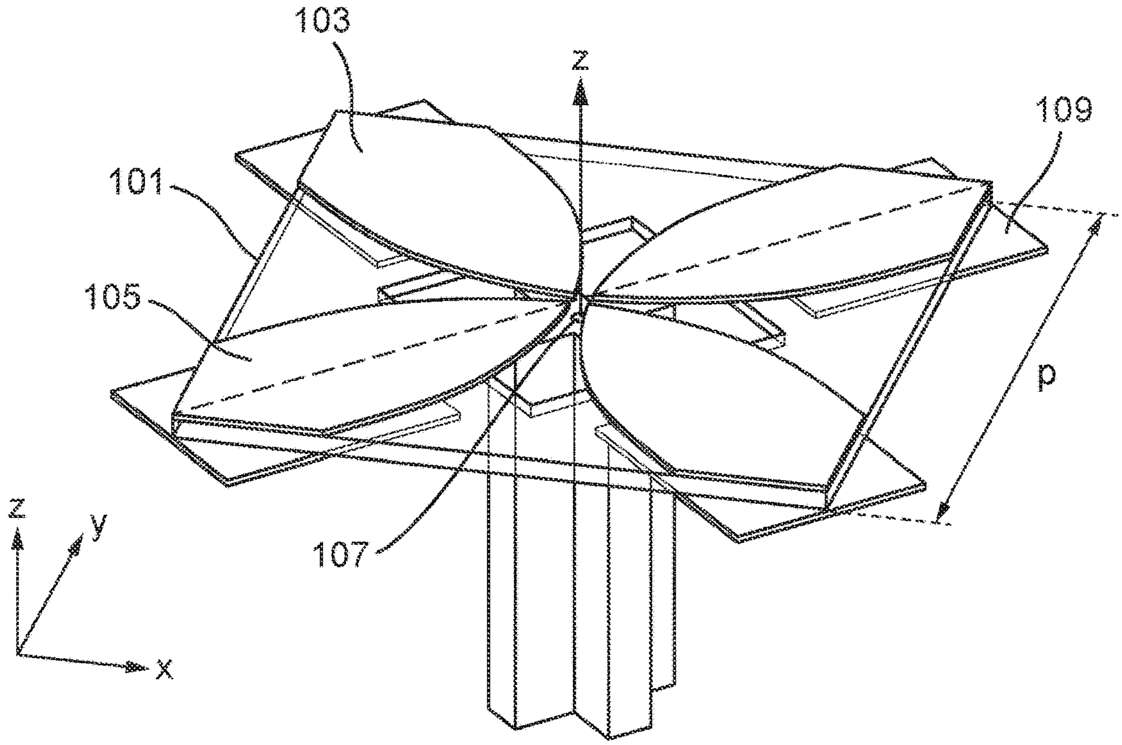
FIG. 1 is a schematic representation of a dual polarized dipole structure according to an example.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

As noted above, a grid pitch in an HCD antenna is typically set according to grating lobe requirements. Once this parameter is set, the length of the dipole arms of the HCD is set. Accordingly, the dipole arm length is typically restricted as a result of the grid pitch, which is generally made as small as possible for the reasons outlined above. However, a longer dipole arm can improve lower frequency performance. Accordingly, in order to improve the low frequency performance of an HCD in which the grid pitch is predetermined, mutual coupling between neighbouring elements can be increased. For example, conductive plates placed underneath (or above) neighbouring dipoles can be provided in order to increase mutual coupling therebetween. However, such mutual coupling functions primarily in an E-plane scan (i.e., in the same plane direction as the dipole arms) and not as well in a H-plane scan (the plane that is orthogonal to the dipole arms). As such, an HCD array with mutual coupling will generally have a region of scan around the H-plane where it will not perform as well compared to the rest of the scan hemisphere.

According to an example, there is provided a dual polarized dipole structure with an improved low frequency response. The dual polarized dipole structure can form part of a radiating element for an antenna or antenna array for example. In an example, a dual polarized dipole structure comprises a first dipole arm comprising a first dipole and a second dipole arm comprising a second dipole. The first and second dipoles are substantially planar and joined to each other at a feed point of the dipole structure which is disposed at the centre of the first and second arms. The first dipole arm and the second dipole arm are so arranged, with respect to a square unit cell, such that the first dipole and the second dipole are orthogonal to one another and so arranged as to lie on respective diagonals of the square unit cell. That is, compared with a typical, e.g., HCD element, the dipole arms are rotated 45 degrees around the normal to the antenna boresight direction (e.g., around the Z axis) such that they lie on the diagonals of the unit cell. In an alternative implementation, the unit cell itself can be rotated whilst keeping the orientation of the dipole arms the same. This results in a physically identical arrangement with the dipole arms arranged along the diagonals of the unit cell. The arrangement of the dipole arms described is applicable in a planar configuration or in a plank configuration.

FIG. 1 is a schematic representation of a dual polarized dipole structure according to an example. In the example of FIG. 1, a square unit cell 101 is depicted. The unit cell 101 has a side length p. That is, each side of the square unit cell 101 has length p. A first dipole arm 103 comprises a first dipole and a second dipole arm 105 comprises a second dipole. The first and second dipoles are joined to each other at a feed point 107 of the dipole structure, which is disposed at the centre of the first 103 and second 105 arms. As can be seen from FIG. 1, the first 103 and second 105 dipole arms are planar and arranged in the XY plane. The first dipole arm 103 and the second dipole arm 105 are orthogonal to one another and arranged on respective diagonals of the square unit cell 101. Accordingly, the dipole arms are longer than in a standard HCD element, thereby improving the low frequency response of the structure without increasing the pitch if the unit cell. That is, given that the unit cell 101 has a side length of p, the length of each dipole arm is $\sqrt{2}p$.

Along the principal planes of scan relative to the unit cell 101, the scans change from E-plane/H-plane to the intercardinal planes, improving the homogeneity of performance along the principal planes. The onset of grating lobes can be increased to $\sqrt{2}f$ if the grid pitch is reduced to $p/\sqrt{2}$. This keeps the dipole arms the same length (p) as with a standard element, but increases the onset of grating lobes to $\sqrt{2}$/along the direction of the grid pitch (i.e., 'horizontally' and 'vertically' when looking at the page). This is beneficial for antenna radiation and Low Observable performance.

As noted above, mutual coupling between dipoles can be increased using coupling plates. Referring to FIG. 1, such coupling plates 109 are depicted underneath each corner of the unit cell 101. In an example, a coupling plate 109 can lie above a dipole arm. Each coupling plate 109 can comprise a conductive planar element that is so arranged as to extend at least partially underneath a substrate onto which a dipole arm is provided. Each coupling plate 109 can therefore extend underneath each end of a dipole arm and can extend outside the periphery of the unit cell 101, thereby enabling dipoles of any neighbouring unit cells (so arranged to form an antenna array for example), to be mutually coupled in to the dipoles of dipole arms 103, 105. In an example, a substrate can comprise a high frequency circuit material, such as a glass reinforced hydrocarbon/ceramic laminate for example. Dipole arms 103, 105 can be printed or deposited onto the substrate using, e.g., PCB manufacturing techniques. In an example, a feed line (e.g., stripline) can be provided vertically to feed RF signals through a ground plane and can be, e.g., soldered to the dipole arms at feed point 107.

Figure 2:
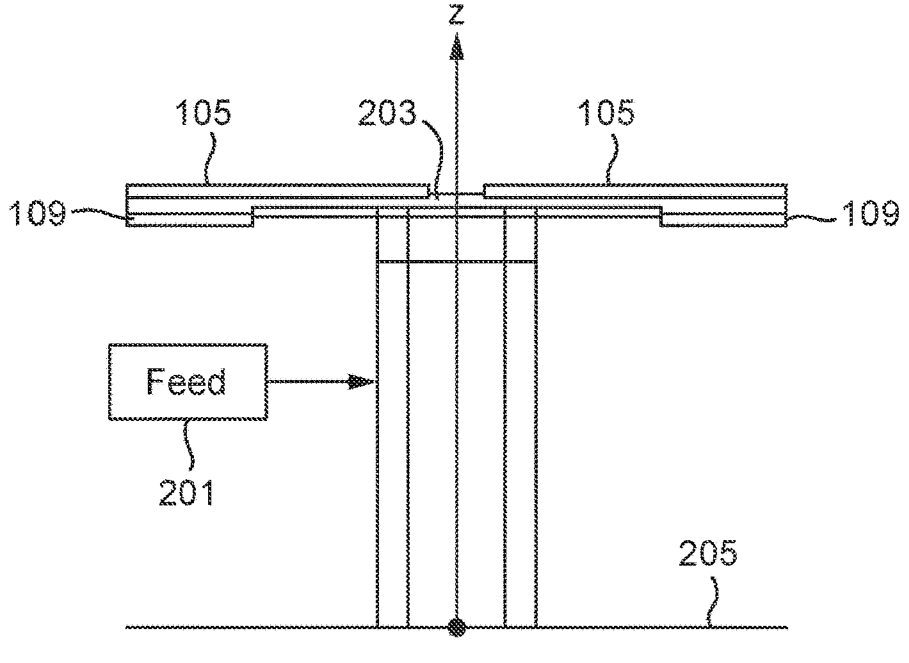
FIG. 2 is a schematic side-on representation of a dual polarized dipole structure according to an example.

FIG. 2 is a schematic representation of a dual polarized dipole structure according to an example. In the example of FIG. 2, the structure is shown in a side view. Patches 109 on the underside of the dipole substrate layer 203 can be used to improve the mutual coupling between elements. In a standard HCD element each dipole arm is only coupled to one of its nearest neighbour in the E-plane. However, in a dual polarized dipole structure according to an example, each dipole arm is coupled to three of its nearest neighbours. This can increase cross-polar coupling (i.e., coupling from one dipole polarisation to the orthogonal one), and improves H-plane scan performance. Feed line 201 is depicted in FIG. 2, along with the ground plane 205.

Figure 3:
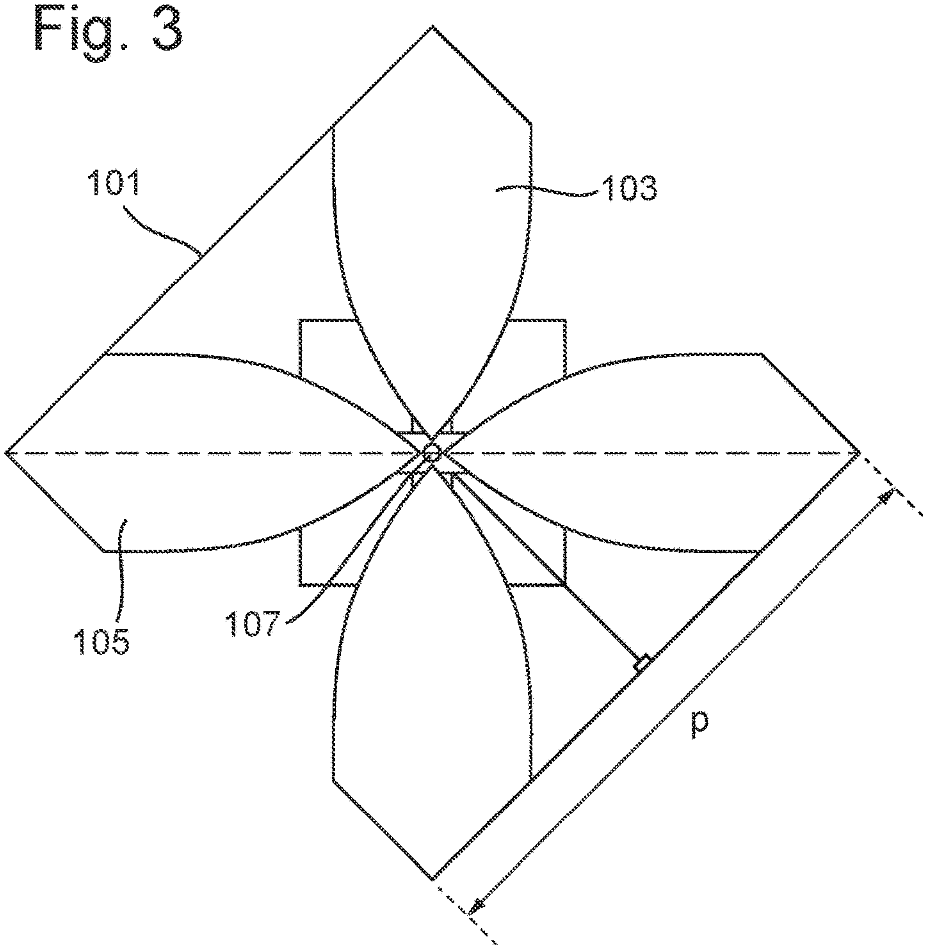
FIG. 3 is a schematic top-down representation of a dual polarized dipole structure according to an example.

FIG. 3 is a schematic representation of a dual polarized dipole structure according to an example. In the example of FIG. 3, a unit cell itself has been rotated around the dipole arms, instead of the dipole arms having been rotated within a unit cell as depicted in FIG. 1 for example. Whilst physically the same as the example of FIG. 1, the arrangement of FIG. 3 influences the grating lobes for an array of such elements. That is, having a rotated square unit cell, whilst keeping the dipole arms 'vertically' and 'horizontally', has the effect of increasing the frequency of the onset of the grating lobes from f for a square unit cell to $\sqrt{2}f$ for the rotated square unit cell (the onset of grating lobes occurring when scanning 'horizontally' and 'vertically' when looking at the element).

Figure 4:
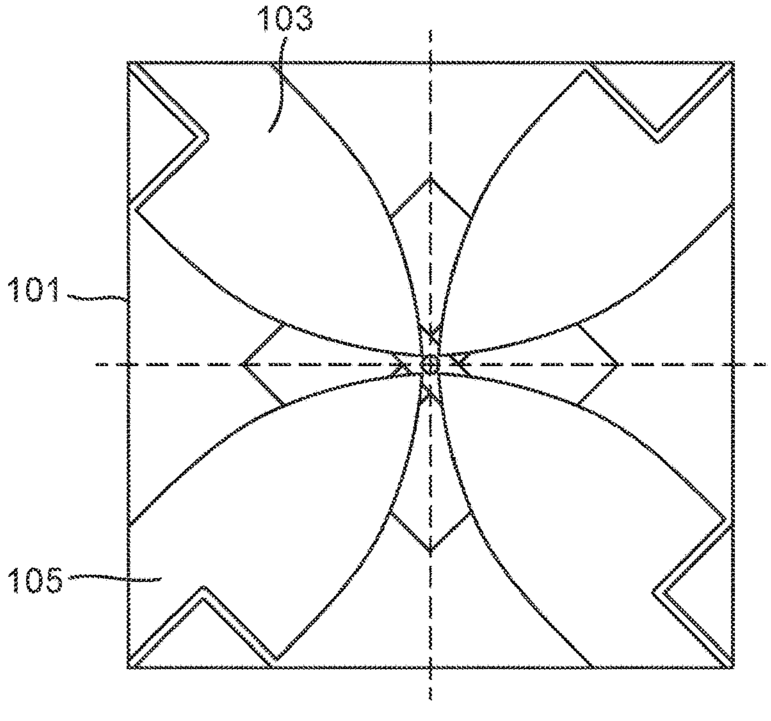
FIG. 4 is a schematic top-down representation of a dual polarized dipole structure according to an example.

FIG. 4 is a schematic representation of a dual polarized dipole structure according to an example. In the example of FIG. 4, mutual coupling between elements is implemented using inter-capacitive digits in the plane of the dipole arms 103, 105. This can be instead of or in addition to capacitive plates 109 that sit above/below the dipole arms. Both methods can be used to achieve wideband performance of the rotated element according to an example.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

The invention claimed is:

1. A dual polarized dipole structure, comprising:
   - a first dipole arm comprising a first dipole, and a second dipole arm comprising a second dipole, the first and second dipoles being substantially planar and being joined to each other at a feed point of the dipole structure, the feedpoint disposed at a center of the first and second dipole arms, whereby to form a dual polarized dipole radiating element for an antenna structure;
   - wherein the first dipole arm and the second dipole arm are so arranged, with respect to a square unit cell, such that the first dipole and the second dipole are orthogonal to one another and so arranged as to lie on respective diagonals of the square unit cell,
   - wherein the square unit cell has side p, and wherein the first and second dipoles extend diagonally across the square unit cell such that each of the first and second dipole arms have a length of $\sqrt{2}p$.

2. The dual polarized dipole structure of claim 1, wherein terminal portions of the first and second dipole arms, distal the feed point, are truncated, whereby to form triangular or cut-out end portions for the first and second dipoles.

3. The dual polarized dipole structure of claim 1, further comprising a ground plane, wherein the radiating element projects outwardly from the ground plane.

4. The dual polarized dipole structure of claim 1, wherein respective end portions of each of the first and second dipole arms comprise inter-capacitive regions.

5. An antenna array comprising multiple unit cells, each unit cell defining a square and comprising a dual polarized dipole structure, each dual polarized dipole structure defining a radiating element of the antenna array, each dual polarized dipole structure comprising:
   - a first dipole arm comprising a first dipole, and a second dipole arm comprising a second dipole, the first and second dipoles being substantially planar and being joined to each other at a feed point of the dipole structure, the feedpoint disposed at a center of the first and second dipole arms, whereby to form a dual polarized dipole radiating element for an antenna structure;
   - wherein the first dipole arm and the second dipole arm are so arranged, with respect to a square unit cell, such that the first dipole and the second dipole are orthogonal to one another and so arranged as to lie on respective diagonals of the square unit cell,
   - wherein each of the first and second dipole arms are coupled to three dipole arms of their respective nearest neighbors.

6. The antenna array of claim 5, wherein unit cells are arranged in a regular tessellation.

7. The antenna array of claim 5, wherein each unit cell comprises a feed line configured to supply a signal to a corresponding feed point of the unit cell.

8. The antenna array of claim 5, further comprising a set of mutual coupling plates configured to couple dipoles in unit cells adjacent one another.

9. The antenna array of claim 8, wherein each mutual coupling plate is arranged underneath a plane of the dipoles.

10. The antenna array of claim 5, wherein end portions of dipoles in unit cells adjacent one another are so configured as to define inter-capacitive digits.

11. A platform comprising the antenna array of claim 5.

12. The platform of claim 11, wherein at least a portion of an outer conductive surface of the platform forms a ground plane for the antenna array.

13. A platform comprising the antenna array of claim 5.

14. The platform of claim 13, wherein at least a portion of an outer conductive surface of the platform forms a ground plane for the antenna array.

15. A dual polarized dipole structure, comprising:
   - a first dipole arm comprising a first dipole; and
   - a second dipole arm comprising a second dipole;
   - wherein the first and second dipoles are substantially planar and joined to each other at a feed point of the dipole structure, the feedpoint disposed at a center of the first and second dipole arms;
   - wherein the first dipole arm and the second dipole arm are so arranged, with respect to a square unit cell, such that the first dipole and the second dipole are orthogonal to one another and so arranged as to lie on respective diagonals of the square unit cell;
   - wherein the square unit cell has side p, and wherein the first and second dipoles extend diagonally across the square unit cell such that each of the first and second dipole arms have a length of $\sqrt{2}p$; and
   - wherein terminal portions of the first and second dipole arms, distal the feed point, are truncated, whereby to form triangular or cut-out end portions for the first and second dipoles.

16. The dual polarized dipole structure of claim 15, further comprising a ground plane, wherein the radiating element projects outwardly from the ground plane.

17. The dual polarized dipole structure of claim 15, wherein respective end portions of each of the first and second dipole arms comprise inter-capacitive regions.

18. An antenna array comprising one or more of the dual polarized dipole structure of claim 15.

* * * * *